UNITED STATES PATENT OFFICE.

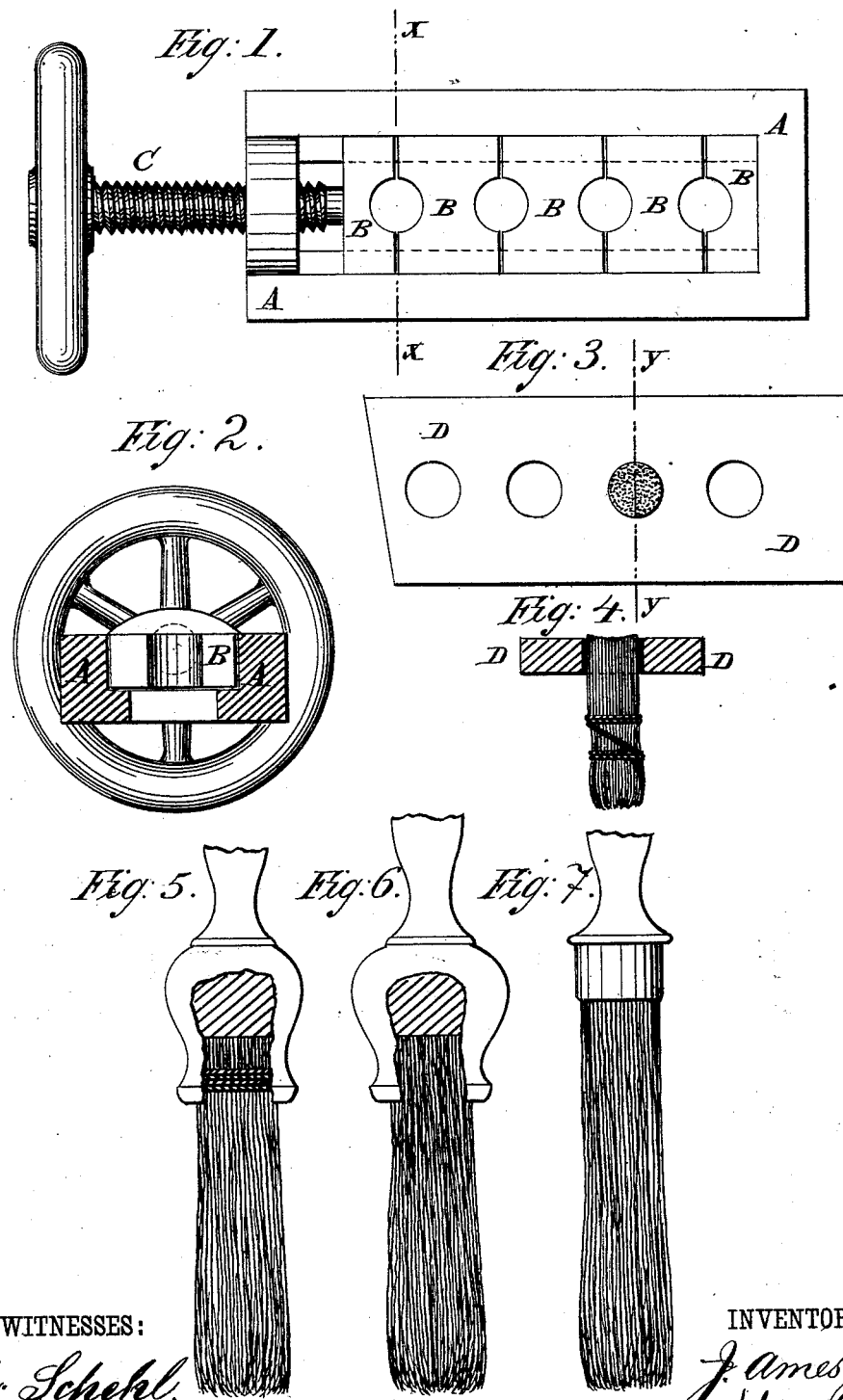

JOHN AMES, JR., OF NEW YORK, N. Y.

IMPROVEMENT IN MAKING BRUSHES.

Specification forming part of Letters Patent No. 217,972, dated July 29, 1879; application filed February 20, 1879.

*To all whom it may concern:*

Be it known that I, JOHN AMES, Jr., of the city, county, and State of New York, have invented a new and useful Improvement in Making Brushes, of which the following is a specification.

Figure 1 is a plan view of a form used in making my improved brushes. Fig. 2 is a cross-section of the same, taken through the line *x x*, Fig. 1. Fig. 3 is a plan view of a modified form of the same. Fig. 4 is a cross-section of the same, taken through the line *y y*, Fig. 3. Fig. 5 is a side view of a brush made in the ordinary way, part being broken away to show the construction. Fig. 6 is a side view of one of my improved brushes, part being broken away to show the construction. Fig. 7 represents my improved knot as applied to another kind of handle.

Similar letters of reference indicate corresponding parts.

The object of this invention is to furnish an improvement in making brushes, by the use of which brushes may be made quicker and with less expense and less stock than when they are made in the usual way, while at the same time the brushes will be stronger and more durable, so that a better article will be produced with less labor and at less cost.

The invention consists in a knot formed by dipping the loose butts of the bristles into melted pitch, glue, or cement, and inserting them in a form, where they are allowed to cool or harden, substantially as herein shown and described.

A is a bar of iron or other suitable material of convenient length. The bar A is slotted longitudinally, and is rabbeted along the sides of the said slot to receive a series of blocks, B, which have half-round, oval, or curved notches formed in their adjacent edges, except the end blocks, the outer edges of which are made straight.

The blocks B are pressed and held together by a screw, C, which passes in through a screw-hole in one end of the bar A. The notches in the edges of the blocks B are made of such a size as to form holes of proper size and shape to receive the knots of bristles. The holes should be slightly flared downward for convenience in removing the knots.

When brushes with socket-handles are to be made, the form may be made in the form of a plane bar, D, with slightly-flaring holes formed through it, as shown in Fig. 3.

In the old way of making knots the bristles are held together by a cord tied around them near their points, as shown in Fig. 4, and another around their butts, as shown in Fig. 5. The butts of the knots were then dipped in melted pitch, glue, or cement, and inserted while the pitch was still soft in the sockets of the handles.

In making my improved knots the cord around the butts of the bristles is omitted. The loose butts are then dipped into melted pitch, glue, or cement, and the knots are drawn through the holes in the form, point foremost, until the butts are flush with the upper surface of the form, where they are allowed to remain until the pitch, glue, or cement cools or hardens, when a slight blow upon the butts loosens the knots and forces them down through the holes in the form. Melted pitch is then placed in the socket of the handles; or the butts of the knots are dipped in melted pitch, glue, or cement, and they are then inserted in the said sockets. When forked handles are to be used, the prongs of the handles are forced into the butts of the knots while they are still in the form, and before the pitch, glue, or cement has had time to cool or harden. The lower part of the handle and the upper part of the knot are then wound with cord, in the usual way.

With this method of forming knots, the butts of the bristles or tufts being dipped into the melted pitch, glue, or cement while loose, the pitch, glue, or cement passes in between the bristles, and fastens them all firmly together, closely filling all the spaces between the said bristles, and holding them all in place, so that they will not be liable to fall out.

Another advantage of this construction is that, the butts of the knots being drawn into and allowed to cool or harden in holes of uniform size, the said butts will all be of exactly the same size, so that they will all fit snugly into the sockets of the handles, and thus form stronger and better brushes.

With this construction, also, a less quantity of bristles can be used, while making brushes substantially as good, the bristles all being held securely in place, and not being liable to drop or pull out.

Having thus fully described my invention, I claim as new and desire to secure by Letters Patent—

A process of making separate brush-knots, that consists in first dipping the loose untied butts of the knots in a hot liquefied cohesive, next drawing the points through the hole of a former-plate until the butts are flush with the upper surface thereof, and finally allowing the knots to remain in the former until the cohesive has cooled and solidified, as set forth.

JOHN AMES, JR.

Witnesses:
JAMES T. GRAHAM,
C. SEDGWICK.